(12) United States Patent  (10) Patent No.: US 7,576,469 B2
Peter  (45) Date of Patent: Aug. 18, 2009

(54) SENSOR COMPRISING A SURFACE WAVE COMPONENT

(75) Inventor: Reto Peter, Nidau (CH)

(73) Assignee: Kistler Holding AG, Winterthur (CH)

( * ) Notice: Subject to any disclaimer, the term of this patent is extended or adjusted under 35 U.S.C. 154(b) by 451 days.

(21) Appl. No.: 11/547,184

(22) PCT Filed: Mar. 31, 2005

(86) PCT No.: PCT/CH2005/000188

§ 371 (c)(1),
(2), (4) Date: Sep. 28, 2006

(87) PCT Pub. No.: WO2005/095895

PCT Pub. Date: Oct. 13, 2005

(65) Prior Publication Data

US 2008/0127730 A1  Jun. 5, 2008

(30) Foreign Application Priority Data

Apr. 2, 2004 (CH) .................................... 561/04

(51) Int. Cl.
*H04Q 5/22* (2006.01)
*H03H 9/25* (2006.01)
(52) U.S. Cl. .................. 310/311; 310/313 D; 340/10.1
(58) Field of Classification Search ................ 310/311, 310/313 R, 313 D, 319, 338, 339
See application file for complete search history.

(56) References Cited

U.S. PATENT DOCUMENTS

| 5,056,055 | A | * | 10/1991 | Shinonaga | ................ | 708/815 |
| 6,427,129 | B1 | * | 7/2002 | Lalla | ........................ | 702/88 |
| 6,617,963 | B1 | | 9/2003 | Watters et al. | | |
| 6,825,794 | B2 | * | 11/2004 | Edmonson et al. | ........... | 342/51 |
| 6,967,428 | B2 | * | 11/2005 | Edmonson et al. | ...... | 310/313 D |
| 7,268,662 | B2 | * | 9/2007 | Hines et al. | ................... | 338/34 |
| 2002/0005677 | A1 | * | 1/2002 | Reindl et al. | ........... | 310/313 D |
| 2003/0069713 | A1 | | 4/2003 | Friedl et al. | | |
| 2004/0143400 | A1 | | 7/2004 | Frey | | |
| 2005/0030159 | A1 | * | 2/2005 | Fukuda | ..................... | 340/10.1 |
| 2007/0131032 | A1 | * | 6/2007 | Liu | .............................. | 73/579 |
| 2008/0088201 | A1 | * | 4/2008 | Konishi et al. | .......... | 310/313 D |
| 2008/0284575 | A1 | * | 11/2008 | Breed | ........................ | 340/438 |

* cited by examiner

*Primary Examiner*—Thomas M Dougherty
(74) *Attorney, Agent, or Firm*—Dority & Manning, P.A.

(57) ABSTRACT

The invention relates to a sensor (4) comprising a surface wave component (2) containing information relating to the sensitivity of the sensor. Said information can be consulted by means of a conventional measuring line (6) between an evaluation appliance (7) and the sensor (4). As said component (2) only comprises a small amount of information, for example three figures, it (2) can be very small, such that it can be integrated into a small sensor (4). The read sensor sensitivity can be automatically adjusted in the evaluation appliance (7). The information can be encoded on the surface wave component (2) by means of various reflectors (11) that can be frequency-selective.

21 Claims, 3 Drawing Sheets

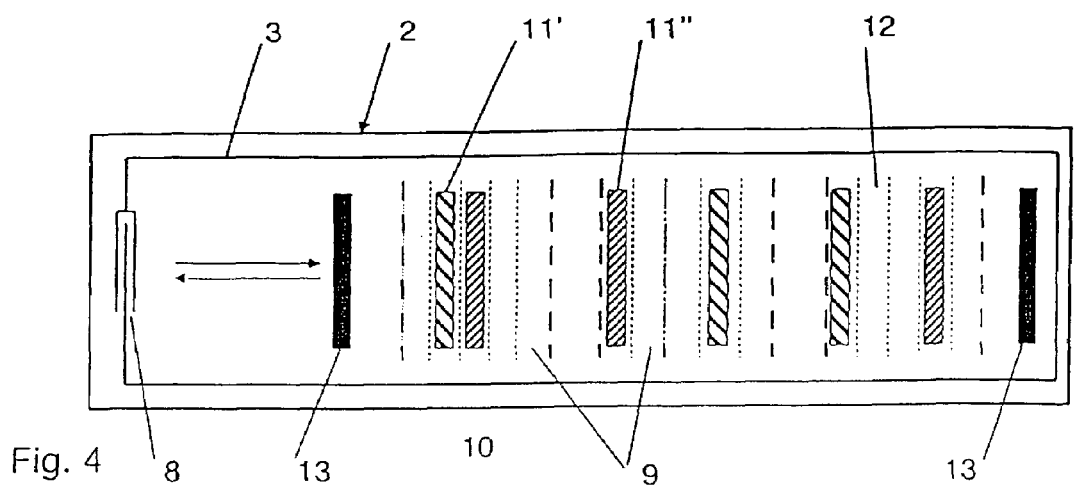
Fig. 4
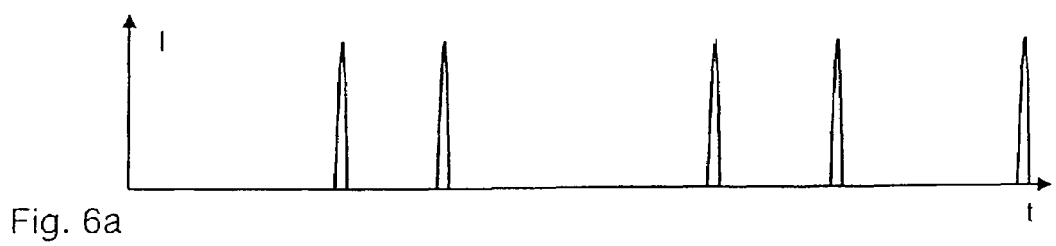
Fig. 6a
Fig. 6b
Fig. 5
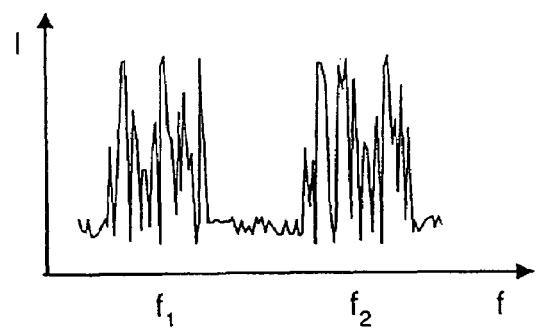

SENSOR COMPRISING A SURFACE WAVE COMPONENT

CROSS-REFERENCE TO RELATED APPLICATIONS

This application claims priority to Swiss Application No. 561/04 filed 2 Apr. 2004 and International Application Aerial No PCT/CH2005/000188 filed on Mar. 31, 2005.

BACKGROUND

The invention relates to a sensor comprising a coded member according to the preamble of claim 1.

Sensors are widely built into structures, for example machine parts, for detecting and transmitting measurement data. These structures may well be exposed to very high temperatures and/or strong accelerations during the measurements. Such sensors, for example piezo-electric sensors, have different sensitivities which most often must be set manually at the amplifier. In the built-in state it is often no longer possible to make out the identification, for example by means of the serial number, and thus to conclude the sensitivities and/or other sensor-specific data from the corresponding data sheet. Furthermore, in the case of a plurality of built-in sensors there is a danger of confusion by confounding the measurement lines.

Some sensors contain memory chips containing the respective data which can be scanned prior to the measurements. These data can be directly included into the measurement protocol. Since such memory chips cannot be used in high-temperature environments mostly passive components are suitable for these applications.

WO 02/082023 describes a method for automatic recognition of the sensor sensitivity. According to this method, a resistance of a certain amount shall be assigned to a sensor whereby the sensor is allocated to a particular group of sensors having a predetermined sensitivity range. This method has the disadvantage that it requires an additional line to the sensor for measuring the resistance so that identification and measurement cannot be performed simultaneously.

OBJECTS AND SUMMARY OF THE DISCLOSURE

The object underlying the invention is to describe a sensor whose sensitivity can be scanned directly via the measurement lines which are already present thereby making it compatible with existing installations. Particularly, this object shall also be achieved for small sensors and shall also be applicable at very high temperatures. The object has been achieved by the features of claim 1.

The sensor according to the invention comprises a coded surface wave component which is coded with information regarding sensor sensitivity. This information can be scanned via a conventional measurement line between an evaluation device and the sensor. Since this member contains only little information, for example three numerals such as a value of 9.54, the member may be designed small enough that it can be integrated also into a small sensor. The sensitivity read can be directly set in the evaluation device.

BRIEF DESCRIPTION OF THE DRAWINGS

The invention is explained with respect to the accompanying drawings. The Figures show:

FIG. 5 shows the spectrum of a signal response from a surface wave component with frequency-dependent reflectors FIGS. 6a, b show time signals of a signal response from a surface wave component having frequency-dependent reflectors filtered for the different frequencies

DETAILED DESCRIPTION OF THE EMBODIMENTS OF THE DISCLOSURE

Figure 1:
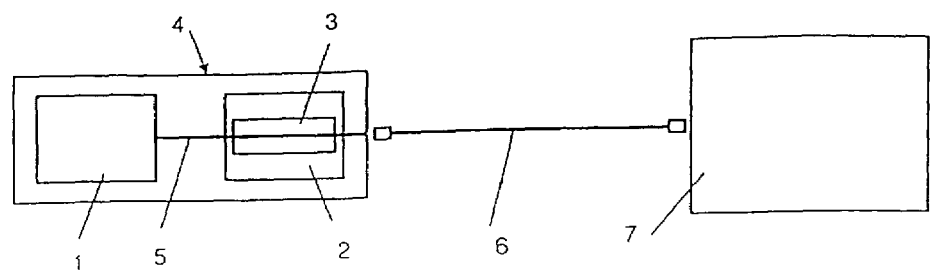
FIG. 1 schematically shows a measuring arrangement containing a sensor according to the invention with integrated sensitivity recognition FIG. 2 schematically shows a representation of a surface wave component

FIG. 1 shows a sensor 4 for detecting and transmitting measurement values. This sensor can be for example a piezo-electric, piezo-resistive or an optical sensor. The measurement data are recorded by a measurement recorder 1 and transmitted within the sensor 4 via a sensor line 5. Externally of the sensor 4, the measurement data are further transmitted via a measurement line 6, for example a coaxial lead, to an evaluation device 7. The sensor 4 comprises at least one surface wave component 2 which is coded with the sensor-specific sensitivity values. This coding can also be scanned via the two leads, the sensor line 5 and the measurement line 6, and corresponds to the sensitivities of the sensor. The scanned sensitivity value can be set directly and autonomously by the evaluation device. In this way, manual setting of the sensitivity is no longer necessary as required nowadays for "plug and play".

The surface wave component 2 comprises a coupling region 3. In this coupling region 3 a high frequency signal is input into the member 2 from the sensor line 5, reads out the coding of the surface wave component 2, and retransmits these data on the same way into the evaluation device 7. Transmission into the coupling region 3 is preferably achieved by means of electromagnetic coupling to the sensor line 5. This electromagnetic coupling can be for example inductive or capacitive coupling. In the case of capacitive coupling one terminal of the transformer is connected to mass.

A galvanically decoupled high-frequency signal transmitted via lines 5 and 6 does not hinder the measuring operation so that measurement and data transfer can be performed simultaneously. In this manner, sensor replacement or an interruption in cabling is recognized immediately and thus ensures permanent monitoring of the sensor as part of a self test.

Figure 2:
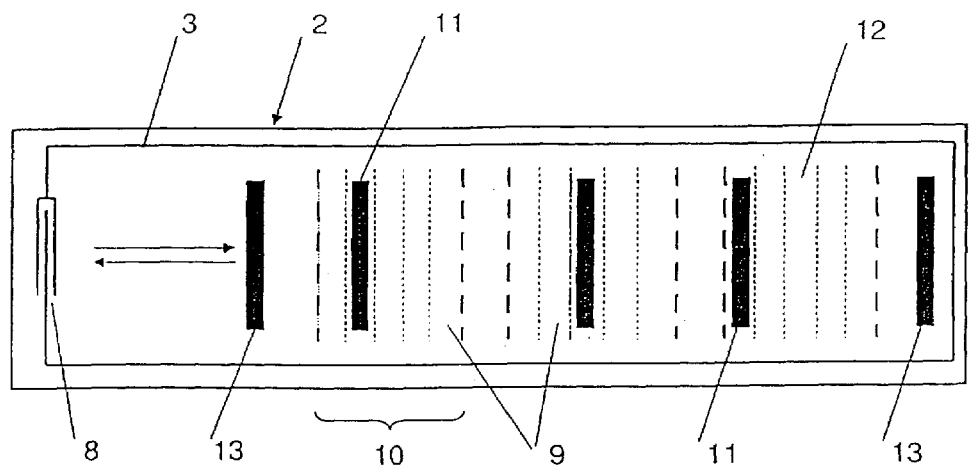

FIG. 2 shows a possible structure of a surface wave component 2 according to the invention. This component is essentially made of piezo-electric support material. It is also possible to use the measurement recorder 1 as a support material for this component 2. On this support material there is an interdigital transformer 8 transforming the incoming high-frequency signal into a surface wave. This wave propagates on the surface of the support material and is partially reflected at appropriately positioned reflectors 11. The reflected signal itself is transformed at the interdigital transformer 8 and sent to the evaluation device 7 as a high-frequency signal.

The coding is performed on the surface wave component 2 by means of the positioning of the reflectors 11. This coding causes a signal response of a scanning signal which is delayed in time wherein the delay time corresponds to the time it takes the surface wave to travel twice the path length to be traveled from the transformer 8 to the respective reflector 11. A reflector 11 may be positioned at any of the possible, preferably equidistant, code sites 9 provided. These imaginary code sites 9 can preferably be divided into blocks 10 which preferably are spaced to each other with at the least the same distance as that between each of the code sites 9. Advantageously, exactly one code site 9 each of a block 10 is provided with a reflector 11. Each reflector 11 causes reflection of a portion of the wave when the wave passes through this site. The position of a reflector 11 on one of the code sites 9 within a block 10 on the carrier substrate determines the delay in time of the response signal in response to the scanning signal since the time delay is proportional to the distance between the interdigital transformer 8 and the position of this reflector 11. The time-dependent response signal is generated by adding the individual response signals of all reflectors.

For example, two blocks 10 each with five code sites 9 may be provided. This results in five to the power two, i.e. 25, different sensitivities which can be read. Additionally, further blocks with range sites 12 may be present. These may for example determine the range of the sensitivities or the coefficients for compensation of the temperature dependence. Preferably, also these range sites are arranged in an equidistant manner.

The advantage of, for example, two ranges each with five sites as compared to a range of 25 sites is that the space requirement of the surface wave component 2 is thereby smaller with the same number of possible different sensitivity values, namely 11 (2×5+1) instead of 25 code sites 9. In this manner, the whole coding can be used in a component with a size of at the most 5 mm, advantageously at the most 3 mm.

If there is enough space also several ranges may be defined so that other data such as measurement range, temperature course or sensor type can be memorized in addition. It is sufficient for many applications if the surface wave component (2) is coded with up to 50 code sites or even with only 25 code sites corresponding to an information content of about 20 and 10 bits, respectively.

Furthermore, the surface wave component 2 can contain at least two, preferably three further reflectors 11 containing calibration reflectors 13 which are shaped more than the other reflectors 11 to enable a higher reflection. Thereby they can be unambiguously recognized during evaluation. One of these reflectors is positioned at the very beginning and one at the end of the area traveled by the wave, and possibly a third one can be positioned close to the first one. These calibration reflectors 13 serve for calibrating the surface wave component 2 by measuring the time difference between the response signals of these calibration reflectors 13. Thereby the delays in time of each individual code site 9 as well as of a range site 12 can be determined since these must be proportional to the geometric distances of all sites to each other. It is important to perform this calibration because a change in length, in particular a change in length due to a change in temperature, pressure or elongation, as well as a change in temperature of the component 2 or a change in the propagation speed of the wave causes expansion or compression of the response signal. If the component is not subject to mechanical forces the temperature at the component and thus at the sensor can be unequivocally concluded by evaluating the response signals of the calibration reflectors 13. At a constant temperature, on the other hand, a change in length of the component and thus a determination of pressure, elongation, acceleration, force and/or moments acting on the component can be concluded by the same evaluation because the component is made of piezo-electric material.

Since the unit has to be integrated into preexisting sensors a particular problem is miniaturization of the component 2 while maintaining the amount of information which can be memorized. The type of coding, the amount of coding and the calibration sites determine the length of the acoustic path which is proportional to a dimension of the component 2. Therefore, there is a special need for components 2 which can provide even more information while requiring even less space.

Figure 3:
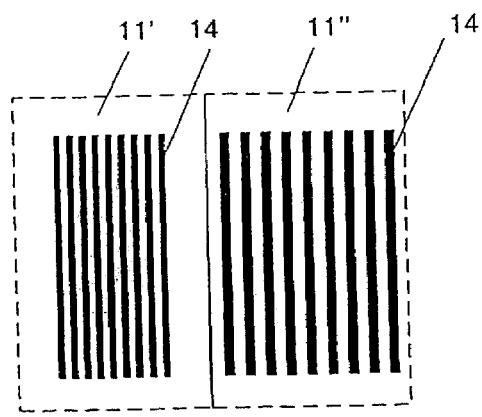
FIG. 3 shows two examples of reflectors for different frequency ranges FIG. 4 schematically shows a representation of a surface wave component with frequency-dependent reflectors

A very efficient solution for decreasing the length dimension of the component 2 is to use a signal as the scanning signal which consists of two different frequency ranges f1 and f2, for example 600 MHz and 800 MHz. Moreover, frequency-selective reflectors 11 must be used each of which reflects only one signal of one of the frequency ranges while a signal of the other frequency range can pass unhindered. Such frequency-selective reflectors are shown in FIG. 3 and are designated as 11' and 11", respectively. They are formed by reflection fingers 14 with different spacing and width. In this way, one reflector 11' and 11" each can be positioned in every block 10 thus occupying two of the code sites 9, one for each frequency range. Thus, $n(n-1)$ different coding states can be described in a block with n code sites 9 without requiring more space. FIG. 4 shows an example of a component 2 of this type having reflectors 11' and 11".

Advantageously, two frequency ranges are selected which do not overlap each other but are close to each other so that a broad band scanning system can evaluate both code ranges in one scanning cycle.

FIG. 5 shows the spectrum of a signal response measured in which the two separate frequency ranges f1 and f2 can be recognized. Determination of the code is done by separately transforming each partial range into a time signal by means of Fourier transform. Such signals are shown in FIGS. 6*a* and 6*b*. Assignment to the total code can be performed in any manner, for example by addition of the two time signals obtained. The calibration signals can be output with a small difference in time in both frequency ranges or in only one frequency range.

The advantage of the sensor according to the invention is that the values read can be related to the sensitivities and/or other sensor-specific parameters directly, i.e. without using a data base and by using the usual measurement line. In this manner any sensor can be run with existing evaluation devices.

Example of a Coding of Sensitivity Values

The sensitivity is reflected by the position of a reflector 11 within a block 10 or within several blocks 10. For this purpose, a block 10 is for example divided into a pattern of ten code sites 9 which can be enumerated from 1 to 10. The distance between two adjacent code sites 9 should correspond to about the distance a surface wave travels in 12.5 ns. The difference in time of a signal response from adjacent reflectors thus is 25 ns since the wave has to travel twice the distance. For two blocks each with ten range sites there are obtained 100 ($=10^2$) different values, hence for example all values between 0 and 1 in steps of 0.01. Tables 1 and 2 indicate the respective value ranges of the different possible delay times which are determined by the position of the reflectors 11.

Due to the uncertainty of a response the reflectors 11 must have a minimum difference in time. The time difference of the code sites corresponds to the resolution of the system which is determined by the inverse of the band width of the scanning system. These band widths are limited so that the minimum difference in time is determined by the scanning system.

An increase in the information content for a given time range can thus be obtained only if different frequency ranges are used.

Figure 7:
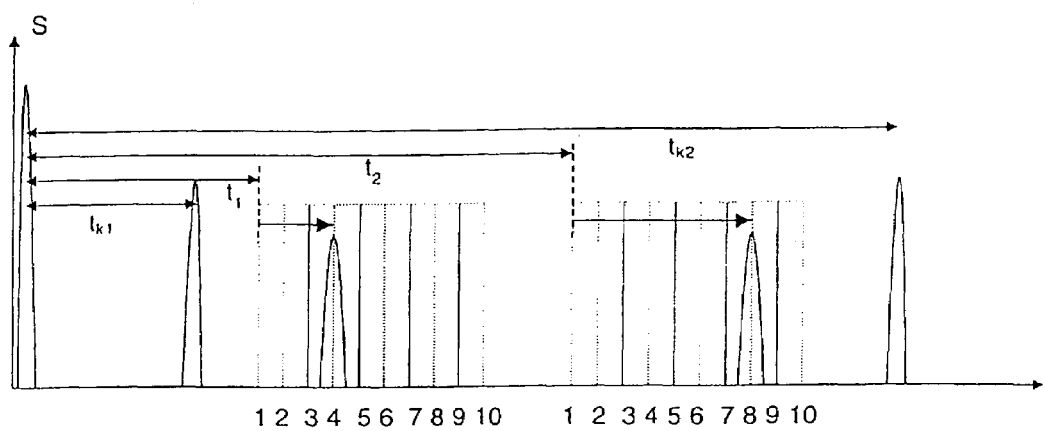
FIG. 7 shows examples of a signal response S as a function of time

The signal responses S are represented in FIG. 7. The response of the calibration reflectors 13 can be clearly seen after tk1 and after tk2. These calibration reflectors 13 are preferably designed to have clearly higher signal responses than the responses of the other reflectors.

TABLE 1

| Delay after $t_1$ | Position | Value range |
|---|---|---|
| 0 ns | 1 | 0.0 pC/N |
| 25 ns | 2 | 0.1 pC/N |
| 50 ns | 3 | 0.2 pC/N |
| 75 ns | 4 | 0.3 pC/N |
| 100 ns | 5 | 0.4 pC/N |
| 125 ns | 6 | 0.5 pC/N |
| 150 ns | 7 | 0.6 pC/N |
| 175 ns | 8 | 0.7 pC/N |
| 200 ns | 9 | 0.8 pC/N |
| 225 ns | 10 | 0.9 pC/N |

TABLE 2

| Delay after $t_2$ | Position | Fine tuning for the value range |
|---|---|---|
| 0 ns | 1 | 0.00 pC/N |
| 25 ns | 2 | 0.01 pC/N |
| 50 ns | 3 | 0.02 pC/N |
| 75 ns | 4 | 0.03 pC/N |
| 100 ns | 5 | 0.04 pC/N |
| 125 ns | 6 | 0.05 pC/N |
| 150 ns | 7 | 0.06 pC/N |
| 175 ns | 8 | 0.07 pC/N |
| 200 ns | 9 | 0.08 pC/N |
| 225 ns | 10 | 0.09 pC/N |

In this way for example a sensor sensitivity of 0.97 pC/N would be coded by 2 time signals at t1+225 ns and at t2+175 ns wherein t1 and t2 are the travel times of a surface wave to the beginnings of the respective blocks 10.

Additionally, other sensor features can be specified such as for example the calibration range in a block n which is added to the already detected sensitivity like an offset value. Table 3 shows an example of the assignment values for delay times of the signal responses in such a third block.

TABLE 3

| Delay after $t_3$ | Position | Range |
|---|---|---|
| 0 ns | 1 | 1.5 |
| 25 ns | 2 | 2.5 |
| 50 ns | 3 | 4 |
| 75 ns | 4 | 6 |
| 100 ns | 5 | 8.5 |

Additionally or alternatively, also temperature coefficients of sensitivity (TCS) can be indicated as correction values in percent. These values describe the relative variation in sensitivity in percent compared to room temperature. Table 4 shows an example of the assignment values for delay times of the signal responses in such a fourth block.

TABLE 4

| Delay after $t_4$ | Position | Correction (in %) |
|---|---|---|
| 0 ns | 1 | −2 |
| 25 ns | 2 | −1.5 |
| 50 ns | 3 | −1 |
| 75 ns | 4 | −0.5 |
| 100 ns | 5 | 0 |
| 125 ns | 6 | 0.5 |
| 150 ns | 7 | 1 |
| 175 ns | 8 | 1.5 |
| 200 ns | 9 | 2 |

LIST OF DESIGNATIONS 1 measurement recorder
2 surface wave component, member
3 coupling
4 sensor
5 sensorline
6 measurement line
7 evaluation device
8 interdigital transformer
9 code sites
10 block
11 reflector, also 11', 11"
12 range site
13 calibration reflector
14 reflection finger

The invention claimed is:

1. A sensor (4) for detecting and transmitting measurement values via a measurement line (6) to an evaluation device (7) comprising a coded component (2), wherein the coding can be directly assigned to sensor-specific sensitivity values and the component (2) is a surface wave component and the coding can be scanned via the measurement line (6) in a similar manner as the measurement values.

2. A sensor according to claim 1, wherein the coding data and the measurement values can be transmitted simultaneously via the measurement line (6).

3. A sensor according to claim 1, wherein the sensor (4) is high-temperature resistant.

4. A sensor according to claim 1, wherein the surface wave component (2) is connected to the sensor line (5) by means of electromagnetic coupling (3).

5. A sensor according to claim 4, wherein the electromagnetic coupling (3) is inductive.

6. A sensor according to claim 4, wherein the electromagnetic coupling (3) is capacitive.

7. A sensor according to claim 1, wherein the surface wave component (2) in its largest dimension is not longer than 5 mm.

8. A sensor according to claim 1, wherein the coding of the surface wave component (2) has not more than 20 bits.

9. A sensor according to claim 1, wherein the surface wave component (2) comprises at least two reflectors (11) for coding the sensitivities.

10. A sensor according to claim 1, wherein the surface wave component (2) comprises at least one reflector (11) for coding the range value of the sensitivities.

11. A sensor according to claim 10, wherein the surface wave component (2) comprises at least two calibration reflectors (13) for calibrating the coding.

12. A sensor according to claim 11, wherein the calibration reflectors (13) generate stronger signal responses than the other reflectors 11.

13. A sensor according to claim 11, wherein by means of the calibration reflectors (13) the temperature in the sensor can be detected.

14. A sensor according to claim 11, wherein by means of the calibration reflectors (13) pressure, elongation, acceleration, force and/or moments can be detected.

15. A sensor according to claim 1, wherein the coding comprises information with respect to at least one range and/or one correction.

16. A sensor according to claim 1, wherein the surface wave component (2) at the same time is the measurement recorder (1) of the sensor.

17. A sensor according to claim 1, wherein the sensor is a piezo-electric, piezo-resistive, or optical sensor.

18. A sensor according to claim 1, wherein the surface wave component (2) comprises frequency-selective reflectors (2) for at least two different frequency ranges.

19. A sensor according to claim 1, wherein the surface wave component (2) in its largest dimension is not larger than 3 mm.

20. A sensor according to claim 1, wherein the coding of the surface wave component (2) has no more than 10 bits.

21. A sensor according to claim 1, wherein the surface wave component (2) comprises at least three calibration reflectors (13) for calibrating the coding.

* * * * *

UNITED STATES PATENT AND TRADEMARK OFFICE
CERTIFICATE OF CORRECTION

PATENT NO. : 7,576,469 B2
APPLICATION NO. : 11/547184
DATED : August 18, 2009
INVENTOR(S) : Reto Peter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this

Seventh Day of September, 2010

David J. Kappos
*Director of the United States Patent and Trademark Office*